US007244397B2

(12) United States Patent
Bigus

(10) Patent No.: US 7,244,397 B2
(45) Date of Patent: Jul. 17, 2007

(54) DIGITAL BURETTE AND METHOD FOR DISPLAYING THE DOSE VOLUME IN SAID DIGITAL BURETTE

(75) Inventor: Hans Jürgen Bigus, Pliezhausen (DE)

(73) Assignee: Hirschmann Laborgeräte GmbH & Co. KG, Eberstadt (DE)

( * ) Notice: Subject to any disclaimer, the term of this patent is extended or adjusted under 35 U.S.C. 154(b) by 673 days.

(21) Appl. No.: 10/470,943

(22) PCT Filed: Jan. 10, 2002

(86) PCT No.: PCT/DE02/00064

§ 371 (c)(1),
(2), (4) Date: Aug. 5, 2003

(87) PCT Pub. No.: WO02/064254

PCT Pub. Date: Aug. 22, 2002

(65) Prior Publication Data

US 2004/0057875 A1 Mar. 25, 2004

(30) Foreign Application Priority Data

Feb. 13, 2001 (DE) ................................ 101 06 463

(51) Int. Cl.
*B01L 3/02* (2006.01)
*G05D 9/00* (2006.01)
*G01N 1/14* (2006.01)

(52) U.S. Cl. ....................... 422/100; 422/105; 422/106; 422/107; 422/108; 436/180; 73/864.01

(58) Field of Classification Search ................ 422/100, 422/105–108; 436/180; 73/863.32, 864, 73/864.01, 864.02, 864.11, 864.13
See application file for complete search history.

(56) References Cited

U.S. PATENT DOCUMENTS 4,754,418 A * 6/1988 Hara .......................... 361/683

(Continued)

FOREIGN PATENT DOCUMENTS

| | | |
|---|---|---|
| DE | 38 17 705 | 12/1988 |
| DE | 195 13 023 | 10/1996 |
| EP | 0 559 223 | 9/1993 |
| EP | 0 762 083 | 3/1997 |
| GB | 2 054 299 | 2/1981 |
| GB | 2 174 459 | 11/1986 |

OTHER PUBLICATIONS www.news.thomasnet.com/fullstory/7964/612.*

(Continued)

*Primary Examiner*—Brian R. Gordon
(74) *Attorney, Agent, or Firm*—Paul Vincent

(57) ABSTRACT

The invention relates to a digital burette having a manual drive for suctioning and applying an adjustable dose volume, a gear unit connected downstream and a digital display device controlled thereby for setting the dose volume. The control comprises an incremental encoder which is functionally connected to the gear unit, at least one sensor for detecting the signals produced by the incremental encoder and a processor connected to the sensor and the display device for calculating the dose volume corresponding to the number of signals. The incremental encoder is, in particular, a sector disc with two groups of sectors of different magnetic field strength disposed alternately in the peripheral direction of the sector disc. A sensor detects the number of turns of the sector disc. To save energy, the power supply of the burette is ensured by a solar cell and two spaced sensors are provided for detecting the number of turns of the sector disc to reduce the clock frequency of the processor for a same measuring accuracy. The invention also relates to a method for displaying the dose volume of such a digital burette.

21 Claims, 2 Drawing Sheets

U.S. PATENT DOCUMENTS

| | | | | |
|---|---|---|---|---|
| 4,760,939 | A | 8/1988 | Ball | |
| 4,815,632 | A * | 3/1989 | Ball et al. | 222/23 |
| 5,108,703 | A * | 4/1992 | Pfost et al. | 422/65 |
| 5,938,076 | A | 8/1999 | Ganzeboom | |
| 5,961,048 | A * | 10/1999 | Prieschl et al. | 239/146 |
| 6,055,509 | A * | 4/2000 | Powell | 705/14 |
| 6,209,752 | B1 | 4/2001 | Mitchell | |
| 6,339,897 | B1 * | 1/2002 | Hayes et al. | 43/132.1 |
| 6,824,738 | B1 * | 11/2004 | Neeper et al. | 422/72 |
| 2002/0134176 | A1 * | 9/2002 | Bigus | 73/864.11 |
| 2004/0147042 | A1 * | 7/2004 | Gratzl et al. | 436/180 |

OTHER PUBLICATIONS www.cherrycorp.com/english/sensors/op__reed.htm.*
www.arun-electronics.co.uk/sensor__reed.htm.*
www.meder.com/en/index.php?page=129&prod=re.*

* cited by examiner

DIGITAL BURETTE AND METHOD FOR DISPLAYING THE DOSE VOLUME IN SAID DIGITAL BURETTE

BACKGROUND OF THE INVENTION

The invention concerns a digital burette having a manual drive for suctioning and delivering an adjustable dose volume, a downstream gear and a digital display device controlled thereby for setting the dose volume, wherein the control comprises an incremental encoder which is operatively connected to the gear, at least one sensor for detecting the signals produced by the incremental encoder and a processor, connected to the sensor, for calculating the dose volume corresponding to the number of signals, the processor being connected to the digital display device. The invention also concerns a method for displaying the dose volume in said digital burette.

Digital burettes are used for a plurality of volumetrical determinations, such as titration, for exact dosing of defined liquid volumes. Of particular interest is the possibility to pre-set and reproduce the dose volume to be delivered which a digital display device, e.g. a display, indicates.

The operation of such digital burettes is based on a lifting piston guided in a pipetting channel for suctioning the liquid to be dosed, wherein the lifting piston usually communicates with the liquid via an air cushion. The lifting piston is manually driven, e.g. actuated by a turning handle, wherein the rotation is transmitted via a mechanical gear to the lifting piston for suctioning or discharging the desired liquid volume. An incremental encoder is operatively connected to the gear and a sensor detects the signals generated by the incremental encoder to detect the dose volume corresponding to the number of turns of the turning handle. The sensor is connected to a processor which calculates the dose volume from the signals, displays same on a digital display device e.g. a liquid crystal display, light diodes or the like.

The incremental encoder may be a slotted disc with slots provided, one behind the other, in the peripheral direction. An optical sensor, e.g. a light barrier, detects the number of turns of the slotted disc by detecting the number of slots passing the sensor. To recognize the direction of rotation of the slotted disc and therefore the lifting direction of the lifting piston (suction or pressure stroke), a second optical sensor, e.g. a second light barrier or a forked light barrier may be provided with which the direction of rotation of the slotted disc is determined from the order of the signals produced by the two sensors.

DE 38 18 531 A1 discloses a piston burette having an incremental encoder in the form of a slotted disc cooperating with a forked light barrier to determine the rotational direction of the slotted disc and the stroke direction of the piston. EP 0 559 223 A1 discloses a bottle filling device having a similar control.

The incremental encoders may also be sector discs with two groups of sectors of different magnetic field strength, wherein the sectors of the two groups are alternately disposed in the peripheral direction of the sector disc. The sectors may be formed e.g. by permanent magnets which induce alternately different and/or opposite magnetic fields. Alternatively, only every second sector of the sector disc may comprise a magnet with the sectors disposed between the magnets being non-magnetic. A sensor is provided which is sensitive to the magnetic field and functions like a magnetic switch to open or close exclusively in response to the magnetic field induced by the respective magnet for detecting the number of turns of the sector disc. The current consumption of these sensors is advantageously small since they require only a voltage which is sufficient to detect the opening or closing position while the opening and closing process per se is effected purely mechanically due to the force field induced by the magnet of the sector disc. The sensor produces a substantially rectangular voltage or current signal when the sector disc is turned.

Digital burettes consume a relatively large amount of current since the digital display device and the overall control including sensors and, in particular, processor require current. The processor requires the greatest amount of current in dependence on its clock frequency. Replaceable dry batteries or rechargeable accumulators are used as power supplies. The non-productive times during replacement or recharging thereof are disadvantageous. They also fail prematurely under the often-corrosive conditions in the laboratory and can damage the burette, in particular when electrolyte is discharged. Digital burettes with lithium cells are also known which are soldered onto a board together with the electric and/or electronic components. Lithium cells of this type are relatively robust but the regular replacement of the cells requires dismantling or replacement of the entire board and is therefore demanding and expensive. Down times are created since long-term storage of the boards would impair the lithium cells.

It is the underlying object of the invention to overcome these disadvantages.

SUMMARY OF THE INVENTION

This object is achieved a digital burette of the above mentioned kind characterized in that at least one solar cell provides power to the control and a sector disc is provided as incremental encoder having two groups of sectors of different magnetic field strength which are alternately disposed in the peripheral direction of the sector disc, and the number of turns of the sector disc is detected using at least one sensor which is sensitive to the magnetic field, preferably a Reed sensor. The solar cell also serves as power supply for the digital display device.

The inventive use of a solar cell as a power supply for the digital burette avoids the need for replacement of batteries, accumulators or the like. The solar cells always provided safe and reliable operation for the digital burette. They are advantageously disposed on a side of the digital burette facing away from the delivery member e.g. on its rear or upper side.

Since the available surface on the casing of the digital burette is small and the arrangement of the solar cells is locally confined, the surface of the solar cells must be minimized. This also requires the energy consumption of the digital burette to be kept low. This is also addressed by the configuration of the digital burette in that the incremental encoder is a sector disc with two groups of sectors of different magnetic field strength which are alternately disposed in the peripheral direction of the sector disc, and at least one magnetic field-dependent sensor, preferably a Reed sensor, for detecting the number of turns of the sector wheel. As previously noted, the current consumption of these sensors is advantageously small since they require only a voltage which is sufficient to detect the opening or closing position while the opening and closing process per se is effected purely mechanically due to the force field induced by the magnet of the sector disc.

In an preferred embodiment, two sensors are disposed at a separation in the peripheral direction of the sector disc which are sensitive to the magnetic field, preferably Reed sensors, for calculating the dose volume in dependence on the number of turns of the sector disc, wherein the angular separation of the sensors differs from an integer multiple of the angle between the sectors of the sector disc. This design permits considerable reduction in the clock frequency of the processor for a given measurement accuracy, e.g. by approximately half, which permits considerable savings in power such that when batteries or accumulators are provided as the energy source, the replacement intervals are considerably increased or—in the preferred case when solar cells are used—the surface of the solar cells required for the necessary amount of current, is considerably reduced and the solar cells can be directly disposed on a surface section of the housing of the digital burette.

As already mentioned, digital burettes are known which utilize different sensor technology, i.e. a slotted disc with two light barriers (DE 38 18 531 A1, EP 0 559 223 A1). The second light barrier, however, serves exclusively for detecting the turning direction of the slotted disc or the lifting direction of the lifting piston and a reduction in the clock frequency of the processor necessarily produces an unacceptable reduction in the measuring accuracy.

In accordance with the invention, both sensors serve to calculate the dose volume in dependence on the number of turns of the sector disc by supplying the signals of the switching-on and off processes of both sensors to the processor for calculating the dose volume. In this fashion, a total of two switching-on and off processes take place when the sector disc is turned by an angle which corresponds to the angle of one sector, i.e. the number of signals per turn of the sector disc is increased resulting in an increase in the measuring accuracy. The overall signal also indicates the position of the sensors with respect to the sectors of the sector disc and when the lifting piston of the digital burette is moved quickly as the sector disc is rotated rapidly, reliable detection of the number of turns of the sector disc is possible when the processor merely registers whether both sensors are in the opened and/or closed position, a situation which occurs only once when the sector disc is rotated past two sectors. The corresponding dose volume can also be determined if the processor only evaluates one of the two signals produced by the sensors when the sector disc is moved quickly, i.e. merely the switching-on and/or off processes of one sensor. When the sector disc is turned slowly or has stopped, the exact position of the sector disc which corresponds to the dose volume, can be determined by the relative position of the sector disc with respect to the two sensors or by means of the two signals produced by the sensors, e.g. the switching-on and off processes of both sensors. In this fashion, the clock frequency of the processor and the current required for operation can be reduced for rapid motion of the lifting piston without sacrificing measuring accuracy. Naturally, the sequence of the signals of the two sensors or the overall signal also indicates the turning direction of the sector disc and therewith the lifting direction of the lifting piston as is known per se for digital burettes having two optical sensors.

Although the sensors of such a control may, in principle, comprise any suitable sensors, Reed sensors-are of primary interest due to their low current consumption and since they require no current for the switching process per se and only low voltages for determining the opening and closing position, wherein e.g. the overall voltage or the overall current of both sensors is transferred to the processor.

A further development of the invention provides that the power supply of at least some electrical and/or electronic components of the control is controlled in dependence on the action of the gear.

The energy supply to the sensors may be switched off when the gear has stopped or be switched on again when the gear is in action e.g. by means of a mechanical pulse. The power consumption of the processor can also be reduced by lowering its clock frequency when the gear has stopped and by increasing it again when the gear is in motion. This may also be effected by means of a mechanical pulse or directly upon receipt of the signal of at least one of the sensors.

The power supply of the digital display device can be switched off with a preset delay when the gear has stopped, wherein the display disappears e.g. after a certain time.

The processor preferably has a minimum operating voltage of at most 2 V. These known processors function safely up to a minimum operating voltage of 2 V and currently have the smallest power consumption, although the electronic industry continues to further miniaturize the processors and further reduce the minimum operating voltage. It is of course advisable to provide the inventive digital burette with these commercially available processors of minimum operating voltage to keep the power consumption as small as possible. As a further development, substitution of the currently available processors with new more energy-saving processors is envisioned.

In a preferred embodiment, the display device has an associated current-less storage for recording at least the last selected dose volume. In this manner, the last selected dose volume is visible even after relatively long stoppage of the digital burette, which is particularly desirable when the digital burette is used for a series of experiments.

The invention also concerns a method for displaying the dose volume of a digital burette having a manual drive for suctioning and discharging an adjustable dose volume, a downstream gear and a digital display device controlled thereby for setting the dose volume, wherein the control comprises an incremental encoder operatively connected to the gear in the form of a sector disc with two groups of sectors of different magnetic field strength disposed alternately in the peripheral direction of the sector disc, at least one sensor, preferably a Reed sensor, for detecting the number of turns of the sector disc and a processor connected to the sensor for calculating the dose volume corresponding to the number of turns of the sector disc, the processor being connected to the digital display device. The inventive method is characterized in that the signals are transmitted to the processor by two sensors disposed in the peripheral direction of the sector disc at a separation which is not an integer multiple of the angle of the sectors of the sector disc and the dose volume is calculated by means of the two signals at least when the gear is moved slowly. The two signals also advantageously detect the direction of rotation of the sector wheel.

The dose volume is advantageously calculated, at least during slow motion of the gear, by means of the number of switching-on and off processes of both sensors, e.g. from the sum of the current or voltage pulses emitted by the sensors to the processor during switching on and off.

In a further development, the processor is programmed with a pre-settable value of the number of turns of the sector disc such that when the number of turns of the sector disc is smaller than the predetermined value, the dose volume is calculated on the basis of the number of switching on and off processes of both sensors. When the number of turns of the sector disc is larger than the predetermined value, the dose volume is calculated exclusively on the basis of the switching-on and off processes of one of the two sensors. If the number of turns of the sector disc is larger than the predetermined value, the dose volume is calculated exclusively on the basis of the switching-on processes or exclusively on the basis of the switching-off processes of one of the two sensors. In this fashion, only one switching process is utilized when the sector disc is rotated through two sectors, wherein a relatively low and current-saving processor clock frequency is sufficient to detect these states. When the sector disc is turned slowly or rests, a small dose volume can also be determined on the basis of the number of switching-on and off processes of both sensors or from the sum of the current or voltage pulses provided to the processor by the two sensors during switching on and off, wherein the maximum error is smaller than the stroke length of the lifting piston of the digital burette associated with a rotation of the sector disc by half a sector.

It may be advantageous to program the processor with two different pre-settable values of the number of turns of the sector disc. In this case, the dose volume is calculated on the basis of the number of the switching-on and off processes of both sensors when the number of turns of the sector disc is smaller than the predetermined low value. When the number of turns of the sector disc is between the two predetermined values, the dose volume is determined on the basis of the number of switching-on and off processes of one of the two sensors. When the number of turns of the sector disc is larger than the predetermined higher value, the dose volume is determined exclusively on the basis of the switching-on or off processes of one of the two sensors. This allows an even finer graduation of the operating states and clocking of the processor.

As indicated above, the current supply of at least some electrical and/or electronic components of the control is controlled in dependence on the action of the gear. In particular, power supply to the sensors can be switched off when the gear is at rest. The clock frequency of the processor is preferably reduced when the gear has stopped.

A further preferred energy reduction consists in that the power supply of the digital display device is switched off with a preset delay when the gear has stopped.

The processor is advantageously loaded with a minimum operating voltage of at most 2V. The voltage applied to the processor during operation can be selected e.g. between approximately 2 and 3.5V.

In a preferred embodiment, at least the dose volume displayed last by the display device is stored without current to provide access to the last selected dose volume even after longer stoppages of the digital burette.

Although batteries or accumulators may in principle be provided as power supply to the electrical and/or electronic components of the digital burette, wherein this operating time is considerably increased by the inventive method, the control and digital display device is advantageously supplied with current from at least one solar cell.

BRIEF DESCRIPTION OF THE DRAWING

The invention is explained in more detail below with reference to one embodiment and the drawings.

DESCRIPTION OF THE EMBODIMENT

Figure 1:
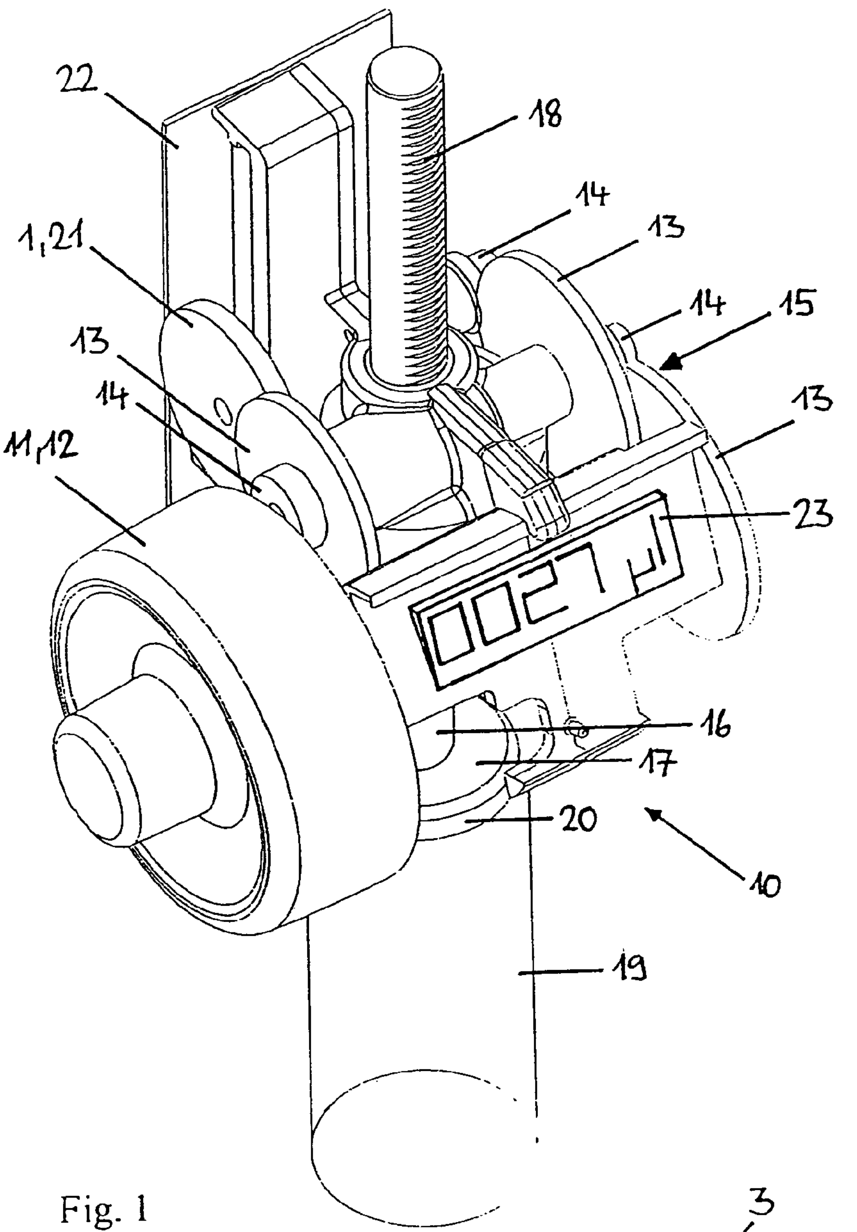
FIG. 1 shows a perspective view of one embodiment of the drive block of a digital burette.

FIG. 1 shows a drive block 10 disposed in the head of a digital burette. The drive block 10 has a manual drive 11 in the form of a rotating handle 12. An identical rotating handle is optionally located on the opposite side, disposed on a common axle. The axle is connected to a piston rod 16 of a lifting piston 17 via a mechanical gear 15 formed from toothed wheels 13 and pinions 14. The piston rod 16 has teeth 18 in its upper section facing the output side of the gear 15. The lifting piston 17 is guided in a pipetting channel 19 and sealed with respect thereto by means of a sealing lip 20 to suction or discharge the desired liquid volume.

Figure 2:
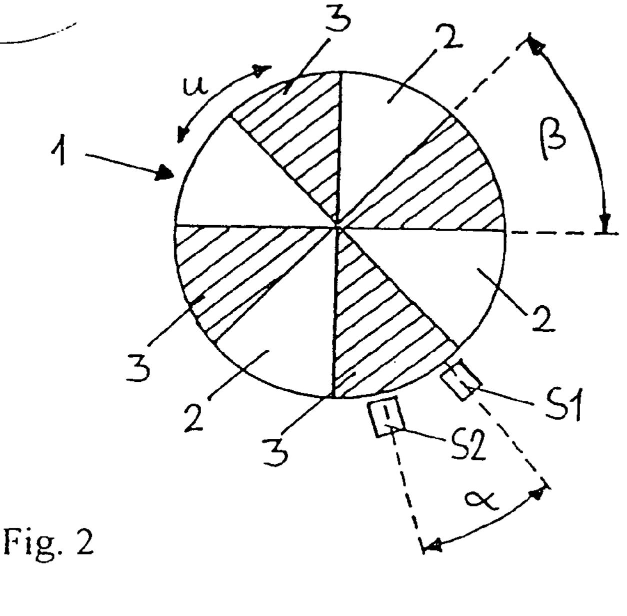
FIG. 2 shows a schematic view of the incremental encoder of the digital burette in accordance with FIG. 1 with two sensors.

To detect the dose volume which corresponds to the number of turns of the turning handle 12, a control is provided with an incremental encoder 21, which is operatively connected to the gear 15, in the form of a sector disc 1 (FIG. 2) having two groups of sectors 2, 3 of different magnetic field strength which are alternately disposed in the peripheral direction u of the sector disc 1. The sectors 2, 3 are provided e.g. with permanent magnets of different polarity (north pole/south pole) such that the magnets of two neighboring sectors 2, 3 of the sector disc 1 each induce a magnetic field having opposite field lines. Alternatively, the sectors 2 of the sector disc 1 can have magnets of the same polarity while the sectors 3 are not magnetic. In the embodiment shown, the sector disc 1 has a total of eight sectors 2, 3.

Figure 3:
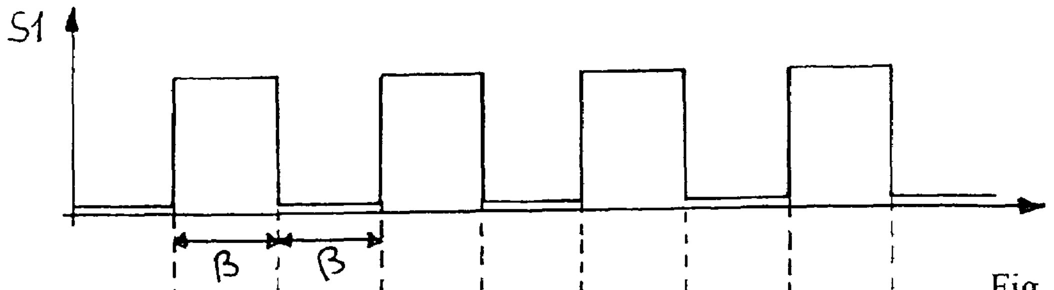
FIG. 3 shows the signal dependence on one sensor in accordance with FIG. 2.
Figure 4:
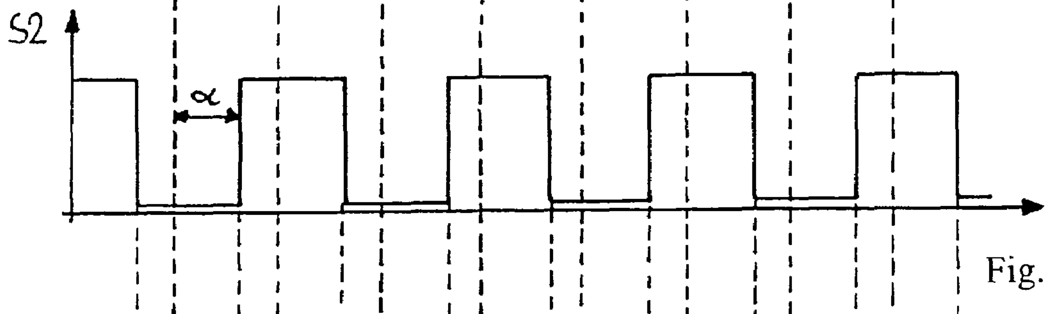
FIG. 4 shows the signal dependence on the other sensor in accordance with FIG. 2.

Two Reed sensors S1, S2 are provided in the peripheral region of the sector disc 1 and are disposed one behind the other in the peripheral direction thereof at an angular separation $\alpha$ which is e.g. approximately ⅔ of the angle $\beta$ between the sectors 2, 3 of the sector disc 1. The sensors S1, S2 are connected to a processor (not shown) which calculates the dose volume from the signals generated by the sensors S1, S2 when the sensor disc 1 is in action, which is then displayed by a digital display device 23 (FIG. 1) e.g. a liquid crystal display. The processor and the display device 23 are supplied with current by a solar cell 22 (FIG. 1). The solar cell 22 applies a small operating voltage to the sensors S1, S2 and each sensor S1, S2 produces a substantially rectangular signal (FIGS. 3, 4) when the sector disc 1 is turned. The rectangular signal is thereby produced by opening and closing the Reed sensors S1, S2 which act like a magnetic switch, wherein the sectors S1, S2 are opened e.g. by the magnetic field of the sectors 2 and are closed by a magnetic field of the sectors 3 which is different with respect thereto. As shown in FIGS. 3 and 4, the angle $\beta$ of the sectors 2, 3 corresponds to the width of a signal and the angle separation a between the two sensors S1, S2, is represented by the phase shift between the two signals T1, T2, from which the peripheral direction of the sector disc 1 can be determined.

In the present embodiment (see FIGS. 5 and 6), the control differentiates between large and small dose volume or between fast and slow action of the turning handle. The processor can be programmed with a preset value of the number of turns of the sector disc 1 and an input of the processor monitors the actual rotating speed of the sector disc 1 and compares it with the predetermined value.

Figure 5:
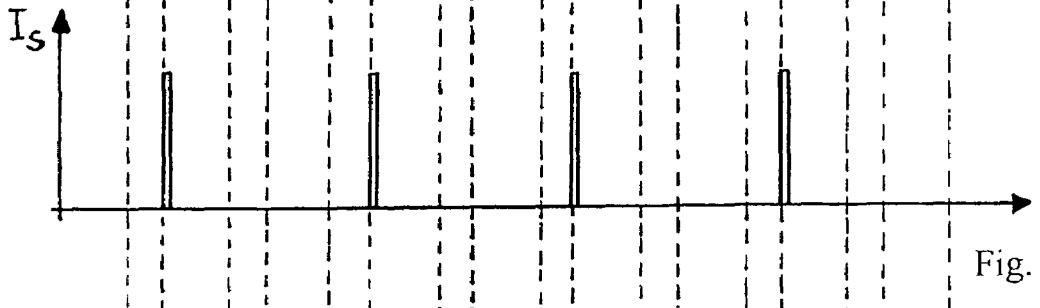
FIG. 5 shows the signals of the sensors processed by the processor under rapid movement of the gear to calculate large dose volumes.
Figure 6:
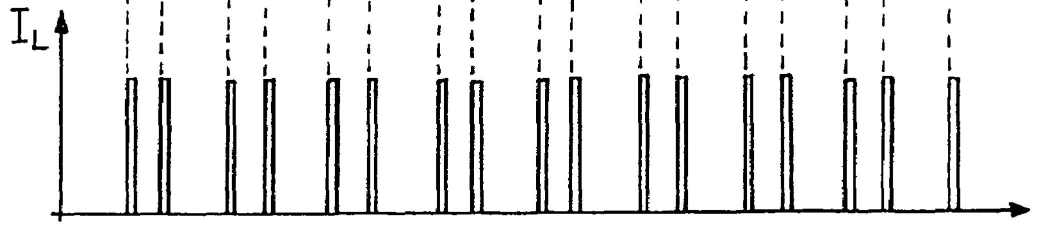
FIG. 6 shows signals of the sensors processed by the processor when the gear is moved slowly, used to calculate small dose volumes.

FIG. 5 shows the signals $I_S$ of the sensors S1, S2 evaluated by the processor during fast action of the turning handle 12 for calculating the dose volume displayed by the display device 23. FIG. 5 shows that during fast action in the present embodiment, only the switching-on processes, i.e. only the respective rising edge of the signal from sensor S1 (FIG. 3) is utilized. This switching process occurs once after each rotation of the sector disc 1 through two sectors 2, 3. Consequently, when the sector disc 1 is rotated faster than the predetermined value, only every fourth switching process of both sensors S1, S2 is used to calculate the dose volume. If one increment is e.g. 1 μl, each of the signals $I_S$ shown in FIG. 5 corresponds to 4 μl. The clock frequency and therefore the current consumption of the processor can be reduced in this fashion when the gear is in fast action.

During fast action of the gear 15 (large dose volume), a relatively coarse resolution (registration of the switching-on processes of only one of the two sensors S1, S2) is sufficient, but for slow action of the gear 15 (small dose volume) the resolution should be relatively high to keep dosing errors small. For this reason, when the number of turns of the sector disc 1 is smaller than the predetermined value, the dose volume is calculated using the switching on and off processes of both sensors S1, S2 (see FIG. 6). For slow action of the gear 15, the switching-on and off processes of both sensors S1, S2, i.e. the rising and falling edges of the signals of the sensors S1 and S2 (FIGS. 3 and 4) are registered, i.e. a total of four signals is evaluated. If an increment corresponds e.g. to 4 μl, each of the signals $I_S$ reproduced in FIG. 6 corresponds to 1 μl or four signals $I_S$ correspond to 4 μl each. The two sensors S1, S2 produce increased measuring accuracy when the gear 15 is in slow action by producing four signals $I_S$ per rotation of the sector disc 1 through the angle β of one sector 2, 3. In this fashion, the dose volume can be precisely determined from the overall signal $I_L$ even for abruptly terminated fast rotation of the sector disc 1.

The power savings resulting from the reduced current consumption of the processor due to reduction in its clock frequency in dependence on the action of the gear 15 is approximately 30% compared to the power consumption of a digital burette having only one sensor.

I claim:

1. A digital burette comprising:

a manual drive for suctioning and delivering an adjustable dose volume;

a gear cooperating with said manual drive;

a incremental encoder operatively connected to said gear, said incremental encoder having a sector disc with two groups of sectors having differing magnetic field strengths which are alternately disposed in a peripheral direction of said sector disc;

a first sensor sensitive to magnetic fields of said sector disc, said first sensor disposed and configured to detect a rotation and a number of turns of said sector disc;

a second sensor sensitive to magnetic fields of said sector disk, said second sensor disposed and configured to detect a rotation and a number of turns of said sector disc, wherein an angular separation between said first sensor and said second sensor differs from an integer multiple of an angle between said sectors of said sector disc;

a processor connected to said sensor for calculating a dose volume corresponding to rotation of said sector disc;

a digital display device connected to said processor for displaying said dose volume; and at least one solar cell connected to said sensor and to said processor for providing electrical power thereto.

2. The digital burette of claim 1, wherein at least one of said first and said second sensors is a Reed sensor.

3. The digital burette of claim 1, wherein said solar cell also serves for supplying power to said digital display device.

4. The digital burette of claim 1, wherein said first and said second sensors are disposed at a mutual separation in said peripheral direction of said sector disc for calculating said dose volume in dependence on said number of turns of said sector disc.

5. The digital burette of claim 1, wherein a power consumption of at least one of said processor and said first and said second sensors is controlled in dependence on an action of said gear.

6. The digital burette of claim 5, wherein said power consumption of said first and said second sensors can be switched off when said gear is at rest.

7. The digital burette of claim 5, wherein said power consumption of said processor can be reduced by reducing its clock frequency when said gear is at rest.

8. The digital burette of claim 4, wherein said solar cell supplies power to said digital display device and a power consumption of said digital display device can be switched off with a preset delay when said gear is at rest.

9. The digital burette of claim 1, wherein said processor has a minimum operating voltage of at most 2V.

10. The digital burette of claim 1, wherein said display device has an associated current-less storage for at least a last set dose volume.

11. A method for operating a digital burette, the method comprising the steps of:

operating a manual drive to either suction or deliver an adjustable dose volume, said manual drive cooperating with a gear, said gear connected to an incremental encoder having a sector disc with two groups of sectors having differing magnetic field strengths which are alternately disposed in a peripheral direction of said sector disc;

detecting magnetic fields of said sector disc using two sensors, said sensors disposed and configured to detect a rotation and a number of turns of said sector disc during suction or delivery;

calculating a dose volume corresponding to rotation of said sector disc using a processor connected to said sensors;

displaying said dose volume on a digital display device connected to said processor; and providing electrical power to said sensor and to said processor using at last one solar cell during suction or delivery, wherein said two sensors are disposed in said peripheral direction of said sector disc at a mutual separation which is not an integer multiple of an angle between said sectors of said sector disc, said dose volume being calculated on a basis of signals from said two sensors, at least during slow action of said gear.

12. The method of claim 11, wherein, at least during slow action of said gear, said dose volume is calculated by a number of switching-on and off processes of both of said two sensors.

13. The method of claim 11, wherein said processor is programmed with a predetermined value of said number of turns of said sector disc and when said number of turns of said sector disc is smaller than said predetermined value, said dose volume is calculated on a basis of a number of switching-on and off processes of both of said two sensors, while for a number of turns of said sector disc which is larger than said predetermined value, said dose volume is calculated only on a basis of switching-on and off processes of one of said two sensors.

14. The method of claim 13, wherein when a number of turns of said sector disc is larger than said predetermined value, said dose volume is calculated only on a basis of switching-on processes of one of said two sensors.

15. The method of claim 11, wherein a power consumption of at least one of said processor and said sensor is controlled in dependence on action of said gear.

16. The method of claim 15, wherein said power consumption of said sensor is switched off when said gear has stopped.

17. The method of claim 15, wherein a clock frequency of said processor is reduced when said gear has stopped.

18. The method of claim 11, wherein said solar cell also supplies power to said digital display device.

19. The method of claim 18, wherein a power consumption of said digital display device is switched off with predetermined delay when said gear has stopped.

20. The method of claim 11, wherein said processor is loaded with a minimum operating voltage of at most 2V.

21. The method of claim 11, wherein at least a dose volume which was last displayed by said display device is stored without using current.

* * * * *